(12) United States Patent
Chou et al.

(10) Patent No.: US 9,853,847 B2
(45) Date of Patent: Dec. 26, 2017

(54) MEASUREMENT AND CARRIER GROUP BASED OPTIMIZATION IN WIRELESS OFDM MULTI-CARRIER COMMUNICATION SYSTEMS

(75) Inventors: Chao-Chin Chou, Taipei (TW); I-Kang Fu, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 1153 days.

(21) Appl. No.: 12/930,236

(22) Filed: Dec. 29, 2010

(65) Prior Publication Data

US 2011/0158118 A1    Jun. 30, 2011

Related U.S. Application Data

(60) Provisional application No. 61/290,960, filed on Dec. 30, 2009.

(51) Int. Cl.
*H04L 12/26* (2006.01)
*H04L 27/26* (2006.01)
(Continued)

(52) U.S. Cl.
CPC ....... *H04L 27/2601* (2013.01); *H04B 17/318* (2015.01); *H04B 17/336* (2015.01);
(Continued)

(58) Field of Classification Search
USPC .... 370/241, 241.1, 252, 254, 255, 331–333; 455/45
See application file for complete search history.

(56) References Cited

U.S. PATENT DOCUMENTS 6,466,606 B1    10/2002   Jou ............................... 375/130
6,546,252 B1    4/2003    Jetzed et al. .................. 455/437
(Continued)

FOREIGN PATENT DOCUMENTS

CN    14133191 A    4/2003
CN    101167396 A   4/2008
(Continued)

OTHER PUBLICATIONS

SIPO, the First Examination Opinion of Chinese patent application 201080003366.4, dated Oct. 16, 2012. (7 pages).
JPO, Office Action of Japanese patent application 2012-546346 dated Jul. 31, 2014 (4 pages).
Chung Yuan Christian University; A Study of Blind OFDM Frequency Offset Estimation; Taiwan; Jun. 2005 (8 pages).
EPO Search Report for the EP patent application 10840598.6 dated Apr. 23, 2015 (7 pages).
(Continued)

*Primary Examiner* — Kevin C Harper
*Assistant Examiner* — Mon Cheri Davenport
(74) *Attorney, Agent, or Firm* — Imperium Patent Works; Zheng Jin; Helen Mao (57) ABSTRACT

In a wireless OFDM multi-carrier communication system, a mobile station obtains measurement result of a first received signal strength indication (RSSI) of a first preamble signal transmitted from a base station over a first radio frequency (RF) carrier. The mobile station also obtains signal offset information between the first RF carrier and a second RF carrier of the base station. In response to the measurement result and the signal offset information, the mobile station estimates a second RSSI of a second preamble signal transmitted by the base station over the second RF carrier without performing scanning over the second RF carrier. In one novel aspect, the mobile station identifies a carrier group containing multiple carriers that belong to the same base station. Measurement optimization, initial cell selection and cell reselection optimization, report reduction, and other carrier group based optimization can be achieved in the multi-carrier system based on identified carrier group.

18 Claims, 7 Drawing Sheets

(51) Int. Cl.
  H04B 17/318 (2015.01)
  H04W 72/08 (2009.01)
  H04B 17/336 (2015.01)
  H04B 17/373 (2015.01)
  H04B 17/382 (2015.01)

(52) U.S. Cl.
  CPC .......... *H04B 17/373* (2015.01); *H04B 17/382* (2015.01); *H04W 72/085* (2013.01)

(56) References Cited

U.S. PATENT DOCUMENTS

| | | | |
|---|---|---|---|
| 8,150,408 B2 | 4/2012 | Rezaiifar et al. | 455/452.2 |
| 2002/0136180 A1* | 9/2002 | Asokan | 370/337 |
| 2005/0288027 A1 | 12/2005 | Cho et al. | 455/442 |
| 2008/0008113 A1* | 1/2008 | Cho et al. | 370/318 |
| 2009/0092178 A1* | 4/2009 | Sayana et al. | 375/227 |
| 2009/0207954 A1* | 8/2009 | Dai et al. | 375/345 |
| 2009/0258621 A1 | 10/2009 | Silvola et al. | 455/226.3 |
| 2009/0310563 A1 | 12/2009 | Chou et al. | 370/331 |
| 2010/0062783 A1 | 3/2010 | Luo et al. | 455/450 |
| 2010/0087152 A1 | 4/2010 | Mourad | 455/67.11 |
| 2010/0220674 A1* | 9/2010 | Fu | 370/329 |
| 2010/0232302 A1 | 9/2010 | Fukui | 370/252 |
| 2010/0278058 A1* | 11/2010 | Damnjanovic et al. | 370/252 |
| 2011/0136498 A1* | 6/2011 | Ben-Eli et al. | 455/452.2 |
| 2012/0250562 A1* | 10/2012 | Li et al. | 370/252 |

FOREIGN PATENT DOCUMENTS

| | | |
|---|---|---|
| CN | 101414986 A | 4/2009 |
| JP | 2002534023 | 10/2002 |
| JP | 2006050545 | 2/2006 |
| JP | 2008500766 | 1/2008 |
| TW | 200746709 A | 12/2007 |
| TW | 200952518 A | 12/2009 |
| WO | WO0038457 A1 | 6/2000 |
| WO | WO0147136 A1 | 6/2001 |
| WO | WO2004010719 A1 | 1/2004 |
| WO | WO2007125702 | 11/2007 |
| WO | WO2009120791 | 10/2009 |
| WO | JP2011519509 | 7/2011 |

* cited by examiner (PRIOR ART)
FIG. 1

FIG. 2

| RECEIVED POWER | OVER CARRIER K | OVER CARRIER K' | DIFFERENCE BETWEEN K AND K' |
|---|---|---|---|
| TRANSMIT POWER | $P_{T,i,k}$ | $P_{T,i,k'}$ | $P_{T,offset}(k,k')$ |
| ANTENNA GAIN | $G_{i,j}(\theta_{i,j})$ | $G_{i,j}(\theta_{i,j})$ | 0 |
| PATH LOSS | $PL(d_{i,j},k)$ | $PL(d_{i,j},k')$ | $PL_{offset}(k,k') = C\log_{10}(f_c(k)/5)$ |
| SHADOW FADING | $X_{i,j}$ | $X_{i,j}$ | 0 |

METHOD OF INITIAL CELL SELECTION
AND CELL RE-SELECTION PROCEDURE

MEASUREMENT AND CARRIER GROUP BASED OPTIMIZATION IN WIRELESS OFDM MULTI-CARRIER COMMUNICATION SYSTEMS

CROSS REFERENCE TO RELATED APPLICATION

This application claims priority under 35 U.S.C. §119 from U.S. Provisional Application No. 61/290,960, entitled "Methods of Scanning in OFDMA Multi-Carrier Systems," filed on Dec. 30, 2009, the subject matter of which is incorporated herein by reference.

TECHNICAL FIELD

The disclosed embodiments relate generally to multi-carrier wireless communication systems, and, more particularly, to scanning/measurement and report reduction in multi-carrier OFDM systems.

BACKGROUND

In current wireless communications systems, 5 MHz~10 MHz radio bandwidths are typically used for up to 100 Mbps peak transmission rate. Much higher peak transmission rate is required for next generation wireless systems. For example, 1 Gbps peak transmission rate is required by ITU-R for IMT-Advanced systems such as the $4^{th}$ generation ("4G") mobile communications systems. The current transmission technologies, however, are very difficult to perform 100 bps/Hz transmission spectrum efficiency. In the foreseeable next few years, only up to 15 bps/Hz transmission spectrum efficiency can be anticipated. Therefore, much wider radio bandwidths (i.e., at least 40 MHz) will be necessary for next generation wireless communications systems to achieve 1 Gbps peak transmission rate.

Orthogonal Frequency Division Multiplexing (OFDM) is an efficient multiplexing scheme to perform high transmission rate over frequency selective channel without the disturbance from inter-carrier interference. There are two typical architectures to utilize much wider radio bandwidth for OFDM system. In a traditional OFDM system, a single radio frequency (RF) carrier is used to carry one wideband radio signal, and in a multi-carrier OFDM system, multiple RF carriers are used to carry multiple radio signals with narrower bandwidth. A multi-carrier OFDM system has various advantages as compared to a traditional OFDM system such as easier backward compatibility, better reuse on legacy single-carrier hardware design, more mobile station hardware flexibility, and lower Peak to Average Power Ratio (PAPR) for uplink transmission. Thus, multi-carrier OFDM systems have become the baseline system architecture in IEEE 802.16m (i.e. for WiMAX 2.0 system) and 3GPP Release 10 (i.e. for LTE-Advanced system) draft standards to fulfill system requirements.

In a multi-carrier OFDM system, however, it takes much longer time for a mobile station to perform scanning. First, a multi-carrier OFDM system typically supports two to four carriers in each cell, which will result in at least two to four times scanning time than a single-carrier OFDM system. Second, the number of cells in 4G systems will be much larger by the demands on more capacity to support higher throughput traffic and better received signal quality. This will lead to more microcells, picocells, and femtocells, in addition to macrocells, be deployed in 4G systems.

Figure 1:
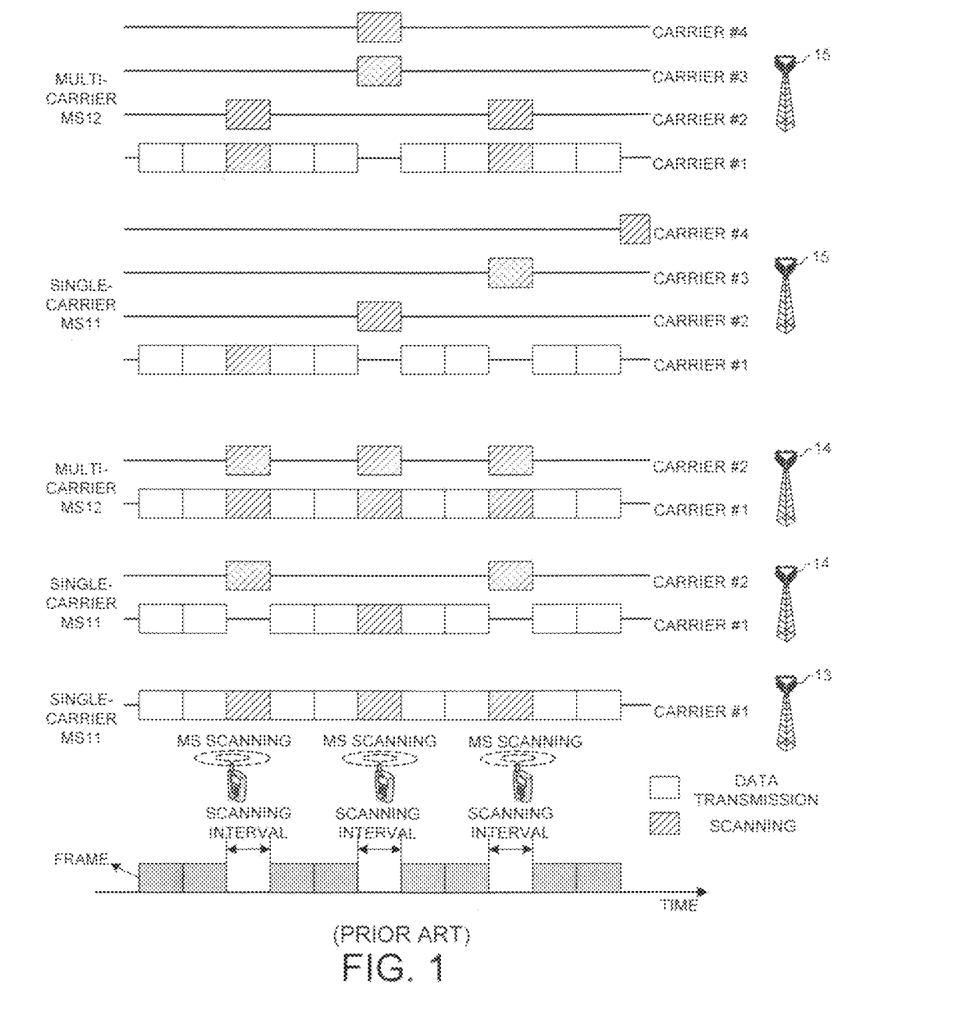
FIG. 1 (Prior Art) illustrates the traditional scanning process of mobile stations and multi-carrier base stations.

FIG. 1 (Prior Art) illustrates a traditional scanning process between mobile stations and multi-carrier base stations. In the example of FIG. 1, a single-carrier mobile station MS11 or a multi-carrier mobile station MS12 is scheduled with certain scanning intervals. For single-carrier base station BS13 supporting carrier #1, MS11 uses all the scanning intervals to scan carrier #1. For multi-carrier base station BS14 supporting two carriers #1 and #2, single-carrier MS11 uses half of the scanning intervals to scan carrier #1 and the other half of the scanning intervals to scan carrier #2. On the other hand, multi-carrier MS12 uses all the scanning intervals to scan both carriers #1 and #2. However, a multi-carrier MS often supports adjacent carriers, and a larger number of carriers will still result in less scanning intervals for each carrier. For example, for multi-carrier BS15 supporting four carriers #1-#4, single-carrier MS11 uses one-fourth of the scanning intervals to scan each carrier, while multi-carrier MS12 uses half of the scanning intervals to scan carriers #1 and #2, and the other half of the scanning intervals to scan carriers #3 and #4.

Therefore, the increase on the number of carriers will result in higher difficulty for an MS to complete scanning over each carrier for each BS. If the scanning opportunities remain the same, then the scanning result will be unreliable because less average duration is allocated for each BS over each carrier. This will degrade performance of certain procedures such as handover that rely on the scanning results. On the other hand, if the scanning opportunities are increased in response to the number of carriers, then the achievable user throughput will be degraded due to less transmission opportunities. This will result in difficulty for BS resource scheduling, especially when the number of users is increased. In addition, autonomous scanning cannot resolve this problem because the MS can only perform background scanning over the same carrier as the one used for data transmission. A solution is sought.

SUMMARY

In a wireless multi-carrier orthogonal frequency division multiplexing (OFDM) communication system, a mobile station obtains measurement result of a first received signal strength indication (RSSI) of a first preamble signal transmitted from a base station over a first radio frequency (RF) carrier. The mobile station also obtains signal offset information between the first RF carrier and a second RF carrier of the base station. In response to the measurement result and the signal offset information, the mobile station estimates a second RSSI of a second preamble signal transmitted by the base station over the second RF carrier without performing scanning over the second RF carrier.

The signal offset information comprises a power difference between preamble signals over the first carrier and the second carrier transmitted by the base station. The power difference may be provided by a serving base station to the mobile station, or obtained via inter-carrier measurement by the mobile station. When the center frequency between the first carrier and the second carrier is large, the signal offset information may also comprise a path loss exponent of surrounding propagation environment in the OFDM system. Based on the estimated RSSI, the mobile station further derives a carrier to interference plus noise ratio (CINR) of the second carrier after the mobile station obtains a total received signal power over the second carrier.

In one novel aspect, the mobile station identifies a carrier group containing multiple carriers that belong to the same base station. The mobile station then selects one carrier in the carrier group as a reference carrier. In one embodiment, the carrier group is identified via receiving RF carrier group information explicitly broadcasted from a serving base station. In another embodiment, the carrier group is identified via receiving reference signals transmitted over the multiple carriers. When the multiple carriers are intra-band carriers, grouping of carriers with similar characteristics becomes possible. Therefore, by using the reference carrier to represent other carriers within the same carrier group, measurement optimization, initial cell selection and cell reselection optimization, report reduction, and other carrier group based optimization can be achieved.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 2:
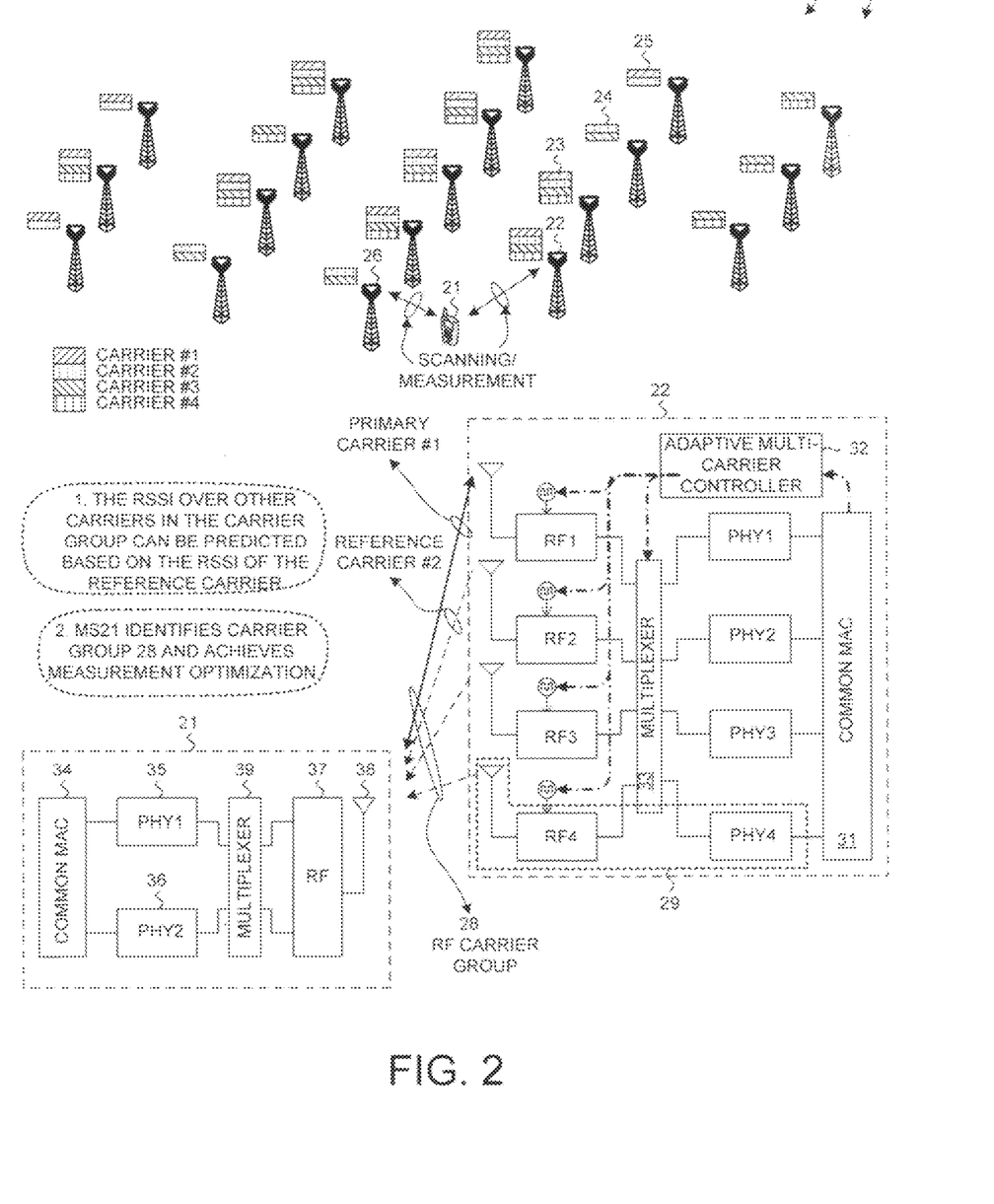
FIG. 2 illustrates a multi-carrier OFDM system in accordance with one novel aspect.

FIG. 2 illustrates a wireless multi-carrier orthogonal frequency division multiplexing (OFDM) system 20 in accordance with one novel aspect. Multi-carrier OFDM system 20 comprises a plurality of base stations, and each BS supports one or multiple radio frequency (RF) carriers. For example, four contiguous RF carriers #1 to #4 are supported in OFDM system 20, BS22 and BS23 support all four RF carriers #1 to #4, BS24 and BS26 support two RF carriers #2 and #3, and BS25 supports two RF carriers #3 and #4. Each base station (e.g., BS22) comprises a common media access control (MAC) module 31, an adaptive multi-carrier controller 32, a plurality of physical layer modules PHY1-PHY4, a plurality of RF transceivers RF1-RF4 coupled to a plurality of antennas, and a multiplexer 33 that interconnects the PHY modules PHY1-PHY-4 and the RF transceivers RF1-RF4. Each PHY module, RF transceiver and antenna forms a transmission module (e.g., 29) as depicted in FIG. 2. Each transmission module corresponds to the operation of one RF carrier. Common MAC module 31 is coupled to both adaptive multi-carrier controller 32 and the transmission modules. Similarly, each mobile station (i.e., MS21) comprises a common MAC module 34, PHY modules 35-36 (PHY1-PHY2), an RF transceiver 37 coupled to antenna 38, and a multiplexer 39 that interconnects the PHY modules PHY1-PHY2 and the RF transceiver.

In multi-carrier OFDM system 20, mobile station MS21 performs scanning (measurement) and detects preamble signals (synchronization signals) transmitted by various base stations over various RF carriers. It is noted that the terms "scanning" and "preamble signal" are defined in IEEE 802.16m WiMAX systems. In 3GPP LTE-advanced systems, on the other hand, the terms "measurement" and "synchronization signal" are defined instead, and have substantially the same meaning as the terms "scanning" and "preamble signal". In the present application, the terms "scanning" and "measurement" are used interchangeably, and the terms "preamble signal" and "synchronization signal" are used interchangeably.

In one embodiment, MS21 performs scanning and detects a preamble signal transmitted by BS22 over RF carrier #2 (e.g., the reference carrier). MS21 then obtains a received signal strength indication (RSSI) of RF carrier #2. In accordance with a first novel aspect, based on the received signal strength indicator (RSSI) of the reference carrier, MS21 is able to estimate the RSSI of another RF carrier (e.g., carrier #3) without perform scanning over RF carrier #3. RF carrier #3 belongs to an RF carrier group 28 supported by the same base station BS22. In accordance with a second novel aspect, MS21 is able to identify multiple RF carriers (e.g., carriers #2-#4) that belong to RF carrier group 28 and achieve scanning/measurement optimization, optimization in initial cell selection and cell reselection, report reduction, and other carrier group based optimization. The two novel aspects are now illustrated below in FIG. 3 and FIG. 4 respectively.

Figure 3:
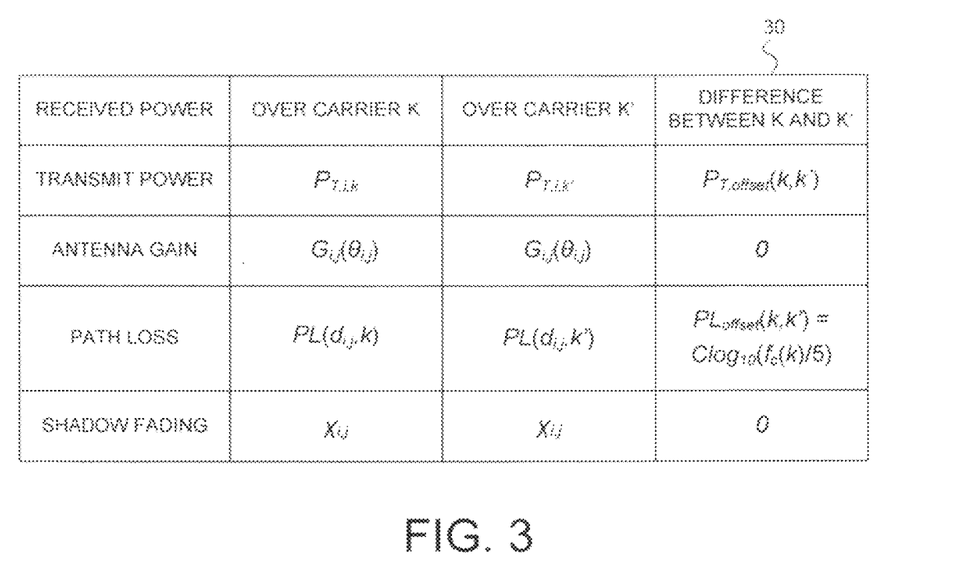
FIG. 3 illustrates the received preamble signal power transmitted from a BS and received by an MS over different RF carriers.

FIG. 3 illustrates received preamble signal power transmitted from a $BS_i$ and received by an $MS_j$ over different RF carriers. Mathematically, the received preamble signal power from $BS_i$ by $MS_j$ over carrier k can be represented by the following equation:

$$P_{R,i,j,k} = P_{T,i,k} + G_{i,j}(\theta_{i,j}) - PL(d_{i,j}, k) - \chi_{i,j} \text{ dBm}, \qquad (1)$$

where
- $P_{R,i,j,k}$: Received power of the preamble signal from $BS_i$ by $MS_j$ over carrier k
- $P_{T,i,k}$: Transmission power on the preamble signal transmitted by $BS_i$ over carrier k
- $G_{i,j}$: antenna gain of signals transmitted from $BS_i$ to $MS_j$
- $\Theta_{i,j}$: direction of $MS_j$ with respect to the steering direction of $BS_i$
- $PL(d_{i,j}, k)$: path loss experienced by signals transmitted from $BS_i$ to $MS_j$ over carrier k
- $X_{i,j}$: shadow fading experienced by signals transmitted from $BS_i$ to $MS_j$.

It is noted that, in the above equation (1), multi-path fading effect is not shown because the scanning operation will take average over preamble measurement results. Typically, a preamble sequence is placed over frequency domain across all subcarriers in a radio resource block. As a result, for Rayleigh fading channels considered in most communication systems, the frequency selective effect will be averaged out when measuring power levels of the preamble sequence.

From equation (1), it can be seen that antenna gain $G_{i,j}(\theta_{i,j})$ and shadow fading $\chi_{i,j}$ are typically not functions of carrier index k. In addition, for signals transmitted from $BS_i$ to $MS_j$, the typical path loss function can be represented by the following equation:

$$PL(d_{i,j},k) = A \log_{10}(d_{i,j}) + B + C \log_{10}(f_c(k)/5) \text{ dB} \quad (2)$$

where $d_{i,j}$ (m) is the distance between $BS_i$ and $MS_j$, and $f_c(k)$ (GHz) is the center frequency of carrier k. The parameters {A, B, C} will be different for different environment. For example, for Rural macro cell environment with LOS condition, the following path loss model may be used:

$$PL(d_{i,j},k) = 40 \log_{10}(d_{i,j}) + 10.5 - 18.5 \log_{10}(h_{BS}) - 18.5 \log_{10}(h_{MS}) + 1.5 \log_{10}(f_c(k)/5) \text{ dB} \quad (3)$$

where $h_{BS}$(m) is the BS antenna height, $h_{MS}$(m) is the MS antenna height, and $f_c(k)$(GHz) is the center frequency of carrier k.

From equation (2), it can be seen that if the carriers supported by BS and MS are adjacent in frequency domain, then the path loss difference due to different carriers will be very small and can be neglected. For example, the common bandwidth of each carrier varies from 5 MHz to 20 MHz. Consequently, the separation from the center frequency of adjacent carriers will be within 20 MHz, which results in very small path loss difference. On the other hand, if the carriers supported by BS and MS are separated in frequency domain, then the path loss difference due to different carriers will be larger. For example, if $f_c(k)$=2.5 GHz for carrier k, and $f_c(k')$=3.5 GHz for carrier k', then the path loss difference under equation (3) is $1.5 \log_{10}(f_c(\Delta k)/5) \approx 3$ dB.

As summarized by table 30 in FIG. 3, the main factor that impacts $P_{R,i,j,k}$, the received power from $BS_i$ by $MS_j$ over a different carrier k comes from $P_{T,i,k}$, the transmit power by $BS_i$ over each carrier k. The path loss $PL(d_{i,j},k)$ over a different carrier k, on the other hand, will not change significantly unless the separation between the center frequencies of the different carriers is large (e.g., reaches to the range of GHz). Therefore, if the received preamble signal power in carrier k ($P_{R,i,j,k}$) is known to the MS by scanning, then the received preamble signal power in carrier k' ($P_{R,i,j,k'}$) can be estimated by adding the following offsets:

$$P_{R,i,j,k'} \approx P_{R,i,j,k} + P_{T,offset}(k,k') + PL_{offset}(k,k') \quad (4)$$

where:
- $P_{T,offset}(k,k')$: the transmit power difference between carrier k and k'
- $PL_{offset}(k,k')$: the path loss difference between carrier k and k', which is a function of the path exponent "C" as depicted in equation (2)

The received preamble signal power is normally used for reporting to a serving base station as the received signal strength indication (RSSI) from a mobile station. The RSSI measurement of a base station over each carrier is typically obtained by the MS via scanning over each carrier. In accordance with the first novel aspect, the MS is able to estimate the RSSI of carrier k' based on the RSSI of carrier k and signal offset information. More specifically, if the MS knows the power difference between carrier k and carrier k' transmitted by the same base station, then the MS can estimate the RSSI over carrier k' based on the RSSI measurement obtained from carrier k without performing scanning operation over carrier k'. To achieve more accurate estimation, the MS can also calculate the path loss difference between carrier k and carrier k' once the MS knows the parameter "C" in advance. The path loss exponent C may be informed by the serving BS, especially if the center frequency difference between carrier k and carrier k' is large.

There are different ways for an MS to know the transmit power difference of a BS. In one example, the transmit power difference between carrier k and carrier k' by a BS may be explicitly informed by a serving BS to the MS. This in turn may be achieved either via a broadcasting message by the serving BS or via specific request from the MS. In another example, the MS may obtain such difference via inter-carrier measurement. Typically, once a BS is deployed in an OFDM system, the transmit power by the BS for each carrier is fixed and remain unchanged for a long time. Therefore, by measuring the received preamble signal power over carrier k and carrier k', the MS is able to derive the transmit power difference, assuming negligible path loss difference, or assuming that the MS already knows the path loss exponent C and is able to calculated the path loss difference. Once the MS obtains the transmit power difference from the initial inter-carrier measurement, the MS can use the same measurement result to estimate the RSSI of carrier k' based on the RSSI measurement obtained from carrier k without performing scanning over carrier k', because such transmit power difference remains unchanged once the BS is deployed.

Because the transmit power difference is derived from received power level, such derived transmit power difference actually contains the antenna gain difference. Although the antenna gains of a multi-carrier BS over two different carriers are assumed the same, it is not always true. For intra-band systems, two different carriers belong to the same frequency band, and the multi-carrier BS normally would use the same antenna for the two different carriers to save cost. For inter-band systems, however, two different carriers belong to different frequency bands, and the multi-carrier BS may use different antennas resulting in different antenna gains. Therefore, when the antenna gains between carrier k and carrier k' of a multi-carrier BS are different, the MS is able to obtain the combined difference of the transmit power level and the antenna gain between carrier k and carrier k' via inter-carrier measurement.

In addition to estimate the RSSI of an RF carrier, an MS may further estimate the Carrier to interference plus noise ratio (CINR) of the RF carrier based on the estimated preamble signal power of the RF carrier. The CINR of carrier k' can be represented by the following equation:

$$CINR_{i,j,k'} = P_{R,i,j,k'} / (I_{R,i,j,k'} + N) \quad (5)$$
$$= P_{R,i,j,k'} / (P_{R,total,j,k'} - P_{R,i,j,k'})$$

where
- $P_{R,i,j,k'}$: received power of the preamble signal from $BS_i$ by $MS_j$ over carrier k'
- $I_{R,i,j,k'}$: received interference power when decoding the signal from $BS_i$ to $MS_j$ over carrier k'
- N: thermal noise power
- $P_{R,total,j,k'}$: total received power by $MS_j$ over carrier k', including the power of the signals transmitted from each BS and the thermal noise power.

From equation (5), it can be seen that once $MS_j$ obtains the total received power over carrier k', $MS_j$ is then able to derive the CINR from $BS_i$ over carrier k' without scanning the preamble signal transmitted by BSi over carrier k'. It should be noted that the measuring of the total received power over carrier k' is much simpler and less time consuming, as compared to the scanning of the preamble signal over carrier k'. This is because the measuring of the total received power only involves the receiving of analog radio signals, but it does not involve further digital processing such as sampling, Fast Fourier Transform (FFT), and correlation that are used during a typical scanning process. In addition, the measuring of the total received power can be performed less frequently (e.g., every 1 sec) as compared to a typical scanning process (e.g., every 10 ms) due to high mobility of the mobile station.

Figure 4:
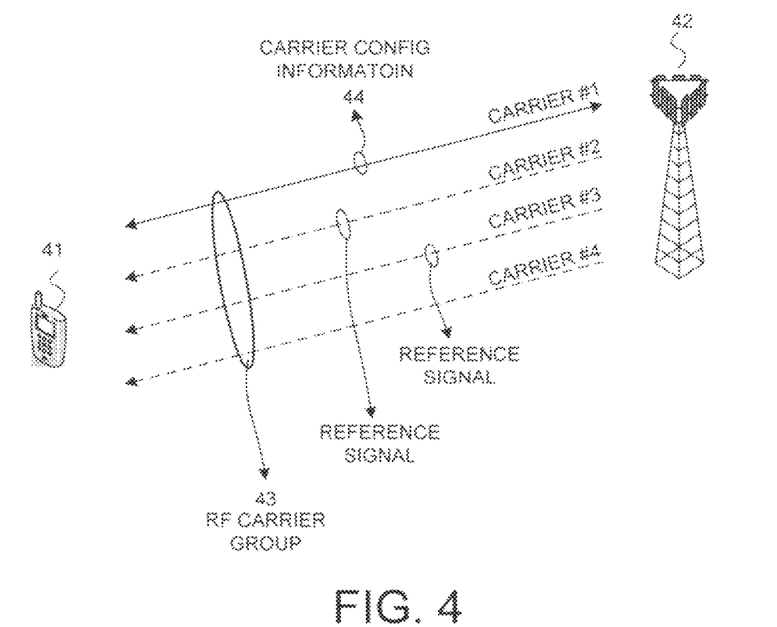
FIG. 4 illustrates two methods for a mobile station to identify RF carrier groups supported by the same base station.

The RSSI and CINR estimation method described above is applicable for difference RF carriers that belong to the same base station. In accordance with the second novel aspect, a mobile station is able to identify a group of RF carriers belong to the same base station using proposed carrier identification methods. FIG. 4 illustrates two methods for a mobile station MS41 to identify RF carriers that belong to a serving base station BS42, which supports four RF carriers #1-#4.

In a first explicit method, serving BS42 broadcasts system configuration messages or unicasts MAC messages to explicitly inform MS41 the group of RF carriers belongs to serving BS42 and/or other neighboring BSs. In the example of FIG. 4, via carrier configuration information 44 transmitted from BS42, MS41 identifies a carrier group 43 that contains four carriers #1-#4, all supported by serving BS42. Examples of the broadcasted or unicasted messages are AAI_GLOBAL-CONFIG, AAI_NBR-ADV, or AAI_MC-ADV defined in IEEE 802.16m specification.

In a second implicit method, serving BS42 embeds the base station identification information into the reference signals transmitted over its RF carriers. The reference signal sequence to be transmitted on each carrier can be associated with the same physical layer base station identification. MS then identifies the carriers pertained to the same BS by investigating the reference signals transmitted over the carriers. In one example, BS42 transmits the same reference signal on its multiple carriers, and MS41 identifies the carriers pertained to the same BS42 by grouping those carriers #1-#4 carrying identical reference signals. In another example, MS41 obtains the base station ID information from the reference signal measured from each carrier and groups those carriers with the same base station ID.

Once an MS is able to identify different carriers that belong to a carrier group, and able to estimate signal quality information of one carrier based on signal quality information of a reference carrier that belongs to the same carrier group; the MS is then able to achieve various performance improvements such as scanning/measurement optimization, optimization in initial cell selection and cell reselection, report reduction, and other carrier group based optimization.

Figure 5:
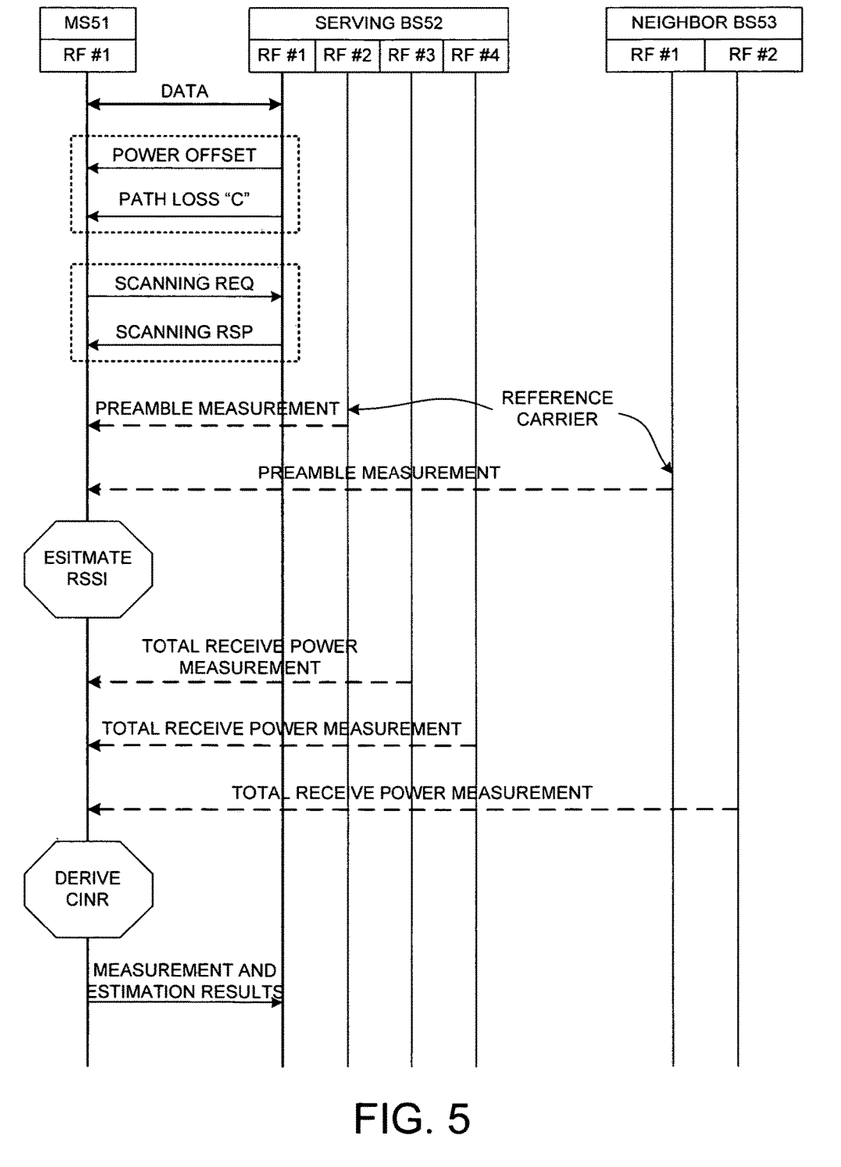
FIG. 5 illustrates a sequence chart of scanning and measurement procedure in a multi-carrier OFDM system in accordance with one novel aspect.

FIG. 5 is a sequence chart that illustrates an example of carrier measurement procedure in accordance with one novel aspect. In the example of FIG. 5, serving base station BS52 supports four carriers #1-#4, and neighboring base station BS53 supports two carriers #1-#2. Mobile station MS51 establishes data connection with serving BS52 over primary carrier #1. For BS52, carrier #2 is selected as the reference carrier, and for BS53, carrier #1 is selected as the reference carrier. Serving BS52 may inform MS51 the transmit power differences between reference carrier #2 and other carriers #3-#4 for BS52, and the transmit power difference between reference carrier #1 and carrier #2 for BS53. In addition, serving BS52 may also inform MS51 the path loss exponent C if necessary. Alternatively, MS51 may obtain the transmit power differences via inter-carrier measurement. To initiating a normal scanning procedure, MS51 transmits a scanning request to serving BS52, and then receives a scanning response from serving BS52. Alternatively, MS51 may perform autonomous scanning to prevent service disruption. For reference carrier #2 of serving BS52, MS51 measures the received preamble signal power from BS52 over carrier #2 and obtains its RSSI. Based on the RSSI of carrier #2, the RSSI of carriers #3 and #4 can be estimated accordingly. Similarly, for reference carrier #1 of neighboring BS53, MS51 measures the received preamble signal power from BS53 over carrier #1 and obtains its RSSI. Based on the RSSI of carrier #1, the RSSI of carrier #2 can also be estimated accordingly. In order to estimate the CINR, MS51 measures the total received signal power over each carrier, and then derives its corresponding CINRs respectively. Finally, if measurement report is required, then MS51 sends the measured and estimated RSSI and CINR results for each carrier to serving BS52.

In some systems, the MS only reports the RSSI and CINR for the selected reference carrier. The serving BS can simply estimate the RSSI for other carriers by itself because the serving BS knows the transmit power difference between the reference carrier and the other carriers. With regard to CINR, if the MS reports the total received power over each carrier, then the serving BS can also estimate the CINR for each carrier by itself.

Figure 6:
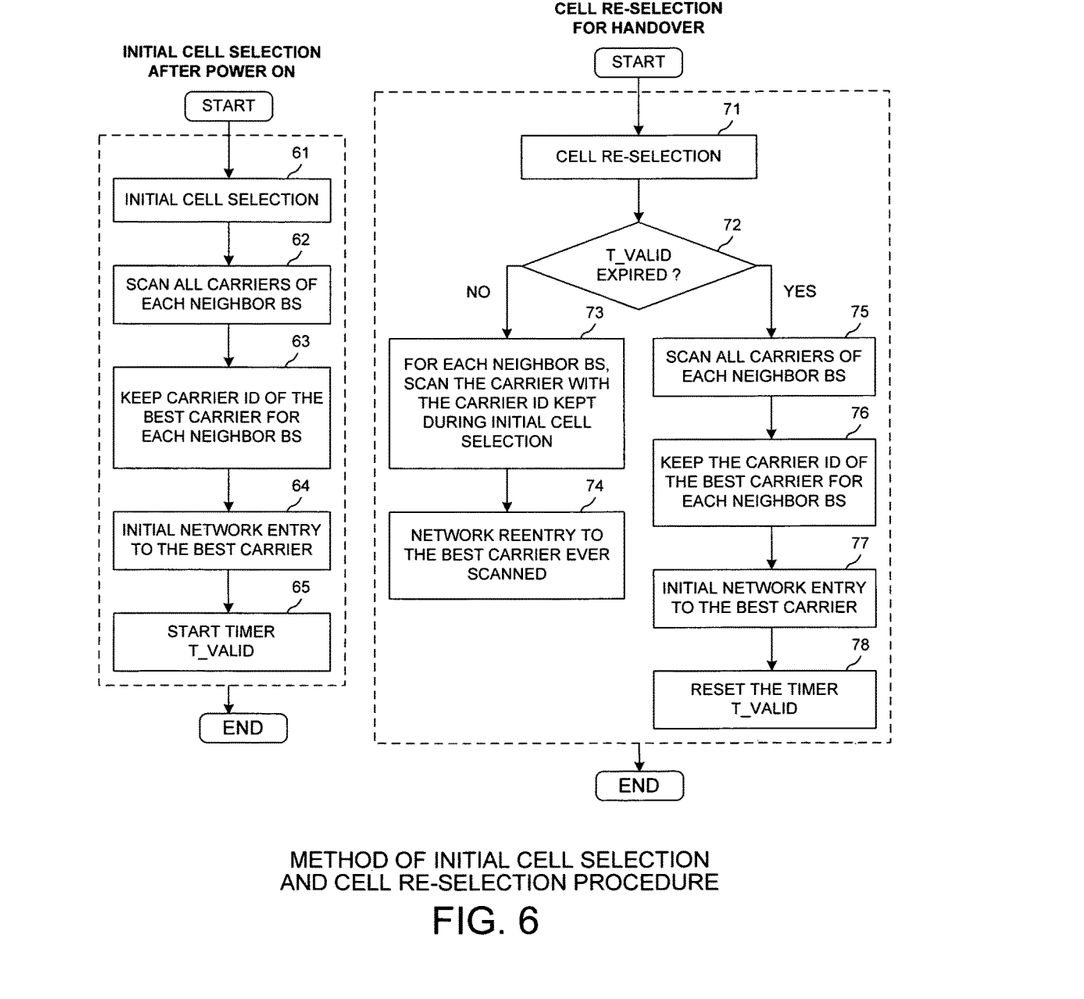
FIG. 6 is a flow chart of a method of initial cell selection and cell reselection in accordance with one novel aspect.

FIG. 6 is a flow chart of a method of initial cell selection and cell reselection in accordance with one novel aspect. After powered on, a mobile station starts initial cell selection process (step 61). The MS scans all available fully configured carriers of neighboring base stations (step 62). After scanning, the MS identifies the physical carrier indexes of the carriers that belong to the same base station. Those carriers form a carrier group, and one of the carriers in each carrier group is selected as the reference carrier (e.g., the best carrier). The physical carrier indexes of the reference carriers are kept by the MS for later use (step 63). The MS also performs initial network entry with its serving BS (step 64) and starts a timer (e.g., T_VALID) (step 65).

During handover, the MS start cell reselection process (step 71). The MS first verifies whether the timer T_VALID has expired (step 72). If the timer has not expired, then for each neighboring BS, the MS only scans the reference carrier with its physical carrier index kept during the initial cell selection (step 73). The MS then performs network reentry to the best carrier ever scanned for handover (step 74). On the other hand, if the timer has already expired, then the MS scans all the carriers of each neighboring BS (step 76). The physical carrier index of the reference carrier is kept by the MS for each neighboring BS (step 76). The MS then performs network reentry to the best carrier ever scanned for handover (step 77) and resets timer T_VALID (step 78).

Figure 7:
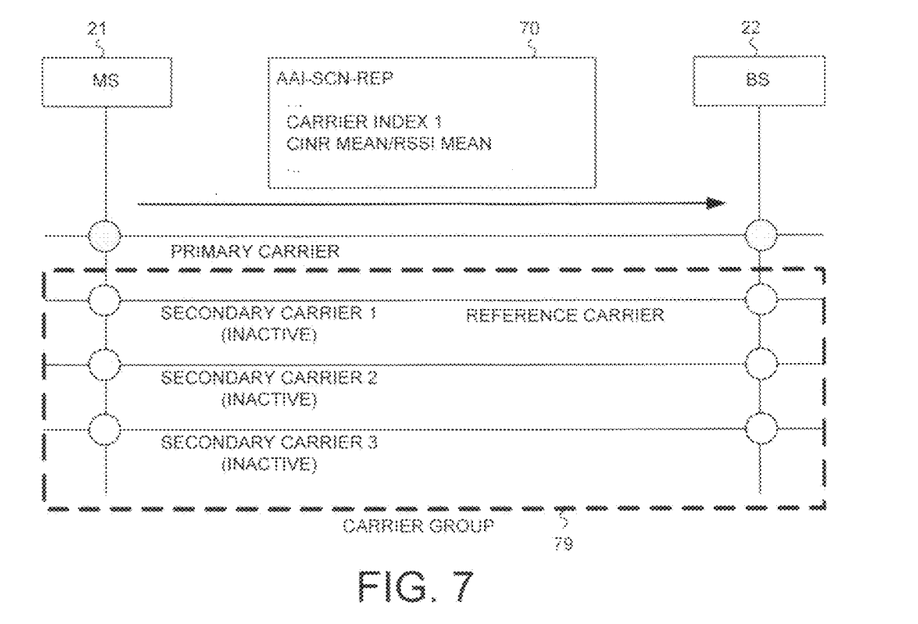
FIG. 7 illustrates an example of scanning report reduction in an IEEE 802.16m wireless system using carrier grouping.

FIG. 7 illustrates an example of scanning report reduction in an IEEE 802.16m system using carrier grouping. In the example of FIG. 7, mobile station MS21 is served by its serving base station BS22, which supports four carriers. MS21 communicates data with BS22 via the primary carrier, and the remaining three secondary carriers 1-3 are inactive. Because the three secondary carriers belong to the same base station, they form a carrier group 79, and carrier 1 is selected as the reference carrier. When MS21 is required to report a scanning report 70 (e.g., AAI-SCAN-REP) to serving BS22, MS21 only needs to report the measurement result (e.g., CINR mean and RSSI mean) of the reference carrier 1 in carrier group 79. By grouping three carriers 1-3 into one carrier group, scanning report reduction can be achieved.

Figure 8:
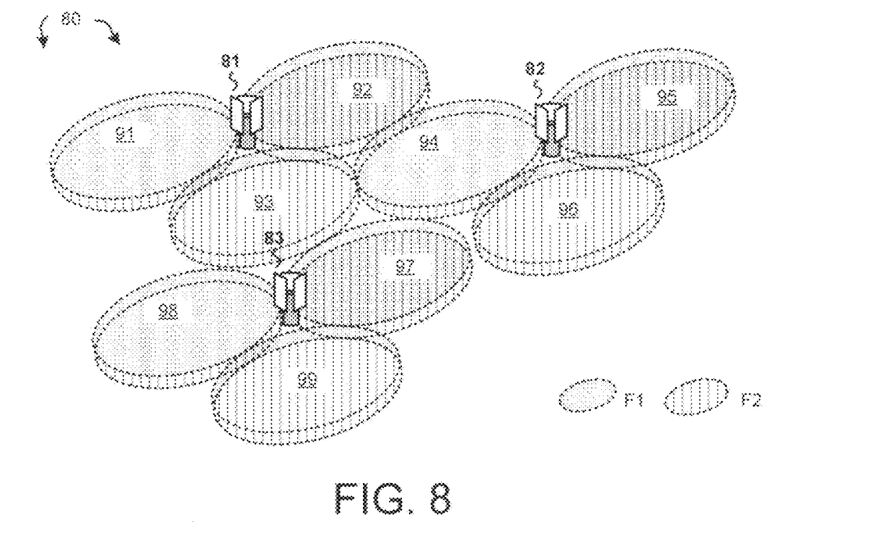
FIGS. 8-9 illustrates an example of measurement report reduction in a 3GPP LTE-Advanced wireless system using cell grouping.
Figure 9:
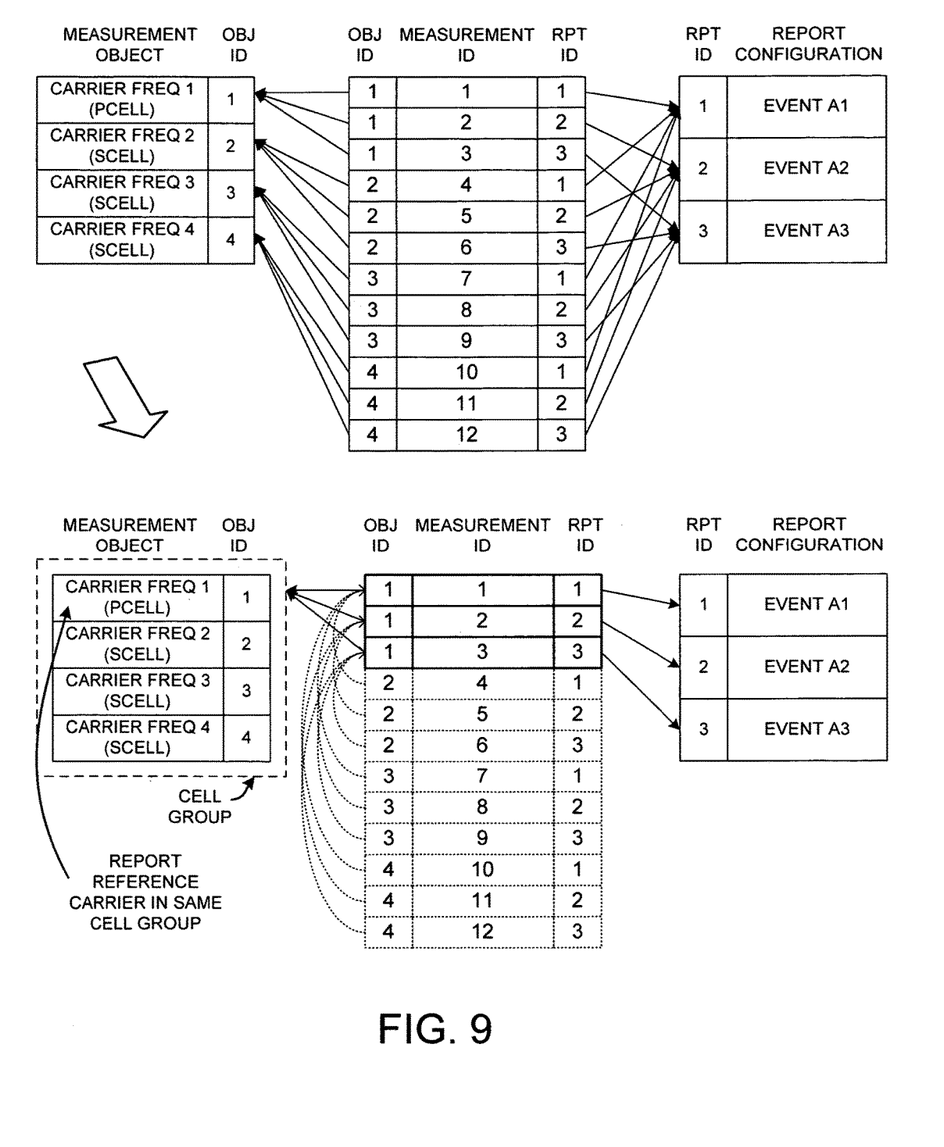

FIGS. 8-9 illustrates an example of measurement report reduction in a 3GPP wireless system using cell grouping. FIG. 8 is a diagram of a 3GPP LTE-advanced wireless communication system 80. Wireless system 80 comprises a plurality of eNBs (e.g., 81-83), each providing service for a number of cells (e.g., 91-99). In the example of FIG. 8, the cells with dotted-shade belong to frequency band F1, and the cells with slashed-shade belong to frequency band F2. F1 cells and F2 cells are co-located and overlaid, providing the same geographic coverage. If F1 and F2 are intra-band cells, then grouping of cells with similar characteristics is possible. When configuring measurement report, an eNB groups its cells with similar characteristics into a cell group. The cell group may consist of either active cells or inactive cells or both. For each cell group, the eNB selects one cell as the "measurement report reference cell". If the cell group includes a Primary P-cell, then the reference cell should be the P-cell. If the cell group includes both active and inactive cells, then the reference cell should be an active cell. After cell grouping and reference cell selection, for an UE being served by multiple cells of the same cell group, the serving cell measurement events is configured for the reference cell only.

FIG. 9 is a diagram of a detailed example of measurement report reduction using cell grouping. The top half of FIG. 9 illustrates the measurement report configuration before cell grouping, while the bottom half of FIG. 9 illustrates the measurement report configuration after cell grouping. In the example of FIG. 9, four cells (one primary P-cell over carrier frequency 1, and three secondary Scells over carrier frequency 2-4) are supported by an eNB. Each cell (a measurement object) is associated with three events A1-A3. In order to report all possible events, 12 measurement ID is configured before cell grouping. On the other hand, with cell grouping, the P-cell is selected as the reference cell. Three and only three measurement IDs are configured for the P-cell, while the events associated with all other S-cells need not be configured and reported. Instead, those events may be indicated by referring to the same measurement IDs configured for the P-cell. The measurement report configuration is thus simplified and the amount of reporting overhead is reduced.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   obtaining measurement result of a first received signal strength indication (RSSI) of a first preamble signal transmitted from a base station over a first radio frequency (RF) carrier by a mobile station in a multi-carrier wireless communication system;
   obtaining signal offset information between the first RF carrier and a second RF carrier of the base station without performing scanning over the second RF carrier, wherein the signal offset information comprises at least one signal information comprising: a power difference between preamble signals over the first RF carrier and the second RF carrier transmitted by the base station, and a path loss exponent of surrounding propagation environment; and
   in response to the measurement result and the signal offset information, estimating a second RSSI of a second preamble signal transmitted by the base station over the second RF carrier without performing scanning over the second RF carrier.

2. The method of claim 1, wherein the signal offset information comprises a transmitting power difference between preamble signals over the first RF carrier and the second RF carrier transmitted by the base station.

3. The method of claim 2, wherein the power difference is provided by a serving base station to the mobile station.

4. The method of claim 2, wherein the power difference is obtained via inter-carrier measurement by the mobile station.

5. The method of claim 1, wherein the signal offset information comprises a path loss exponent of surrounding propagation environment in the system.

6. The method of claim 1, further comprising:
   obtaining a total received signal power over the second RF carrier; and
   deriving a carrier to interference plus noise ratio (CINR) of the second RF carrier.

7. The method of claim 1, further comprising:
   reporting the first RSSI of the first preamble signal and the estimated second RSSI of the second preamble signal to a serving base station.

8. A method, comprising:
   (a) receiving a first received signal strength indication (RSSI) of a first preamble signal, wherein the first preamble signal is transmitted from a base station to a mobile station over a first radio frequency (RF) carrier in a multi-carrier wireless communication system; and
   (b) obtaining a second RSSI of a second preamble signal transmitted by the base station to the mobile station over a second RF carrier, wherein no scanning operation is performed over the second RF carrier by the mobile station, and wherein the second RSSI is based at least in part on one or more signal offset information between the first RF carrier and the second RF carrier of the base station, and wherein the signal offset information comprises at least one signal information comprising: a power difference between preamble signals over the first RF carrier and the second RF carrier transmitted by the base station, and a path loss exponent of surrounding propagation environment.

9. The method of claim 8, wherein the obtaining in (b) comprises:
   estimating the second RSSI based on the first RSSI and signal offset information between the first RF carrier and the second RF carrier of the base station.

10. The method of claim 8, wherein the obtaining in (b) comprises:
   receiving the second RSSI estimated by the mobile station, wherein the second RSSI is estimated based on the first RSSI and signal offset information between the first RF carrier and the second RF carrier of the base station.

11. The method of claim 8, further comprising:
   transmitting a signal offset information to the mobile station, wherein the signal offset information comprises a transmitting power difference between preamble signals over the first RF carrier and the second RF carrier transmitted by the base station.

12. The method of claim 8, further comprising:
   transmitting a signal offset information to the mobile station, wherein the signal offset information comprises a path loss exponent of surrounding propagation environment in the system.

13. The method of claim 8, further comprising:
   receiving a total received signal power over the second RF carrier from the mobile station; and obtaining a carrier to interference plus noise ratio (CINR) of the second RF carrier derived based on the obtained second RSSI and the total received signal power over the second RF carrier.

14. The method of claim 8, wherein the base station is a serving base station of the mobile station, and wherein the receiving in (a) and the obtaining in (b) is performed by the serving base station.

15. The method of claim 8, wherein the base station is a neighboring base station of the mobile station, and wherein the receiving in (a) and the obtaining in (b) is performed by a serving base station.

16. A method, comprising:
(a) identifying a number of radio frequency (RF) carriers that form an RF carrier group, wherein the RF carrier group belongs to a base station in a multi-carrier communication system, and wherein the identifying involves one of group-identification methods comprising: (i) receiving RF carrier group information explicitly broadcasted from a serving base station, (ii) receiving a first and a second reference signals over a first and a second RF carriers respectively, and wherein the first and the second RF carriers belong to the same base station if the first and the second reference signals are the same, and (iii) receiving a reference signal over a RF carrier and thereby obtaining a base station ID information associated with the received reference signal;
(b) selecting a reference RF carrier from the RF carrier group;
(c) obtaining signal quality information of the reference RF carrier; and
(d) obtaining signal quality information of a second RF carrier that belongs to the RF carrier group based at least in part on the obtained radio signal information of the reference carrier, and wherein the mobile station performs scanning over the reference RF carrier but not over the second RF carrier during cell reselection if a predefined timer has not expired.

17. The method of claim 16, wherein the obtaining in (c) involves scanning a first preamble signal over the reference RF carrier, and wherein the obtaining in (d) involves estimating a received signal strength indicator (RSSI) of a second preamble signal over the second RF carrier.

18. The method of claim 16, wherein the mobile station reports a measurement result of the reference RF carrier, and wherein the mobile station does not report any measurement result of the second RF carrier to its serving base station.

* * * * *